(12) United States Patent
Iwashita et al.

(10) Patent No.: US 7,479,750 B2
(45) Date of Patent: Jan. 20, 2009

(54) CONTROLLER FOR ELECTRIC MOTOR

(75) Inventors: Yasusuke Iwashita, Fujiyoshida (JP); Kazuomi Maeda, Yamaga (JP); Yukio Toyozawa, Koshi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 176 days.

(21) Appl. No.: 11/699,582

(22) Filed: Jan. 30, 2007

(65) Prior Publication Data

US 2007/0205738 A1 Sep. 6, 2007

(30) Foreign Application Priority Data

Jan. 31, 2006 (JP) .............................. 2006-023290

(51) Int. Cl.
*G05B 11/01* (2006.01)

(52) U.S. Cl. ................... 318/560; 318/567; 318/568.13

(58) Field of Classification Search ................ 318/560, 318/565, 567, 568.1, 568.13, 568.22, 569
See application file for complete search history.

(56) References Cited

U.S. PATENT DOCUMENTS

| | | | | |
|---|---|---|---|---|
| 5,696,672 | A | * | 12/1997 | Tsuruta et al. ................ 700/28 |
| 6,591,183 | B2 | * | 7/2003 | Ishikawa et al. ............ 701/103 |
| 6,593,719 | B2 | | 7/2003 | Satta et al. |
| 6,639,374 | B2 | * | 10/2003 | Shimoyama ................ 318/560 |
| 2004/0145333 | A1 | | 7/2004 | Toyozawa et al. |

FOREIGN PATENT DOCUMENTS

| | | |
|---|---|---|
| JP | 1-318103 | 12/1989 |
| JP | 6-343284 | 12/1994 |
| JP | 9-212218 | 8/1997 |
| JP | 2002-199767 | 7/2002 |
| JP | 2004-280772 | 10/2004 |

OTHER PUBLICATIONS

A Japanese Notice of Reasons for Rejection mailed Oct. 9, 2007 in JP Application No. 2006-023290 (including a partial translation thereof).

* cited by examiner

*Primary Examiner*—Rina I Duda
(74) *Attorney, Agent, or Firm*—Drinker Biddle & Reath LLP (57) ABSTRACT

A controller including a learning control unit for determining learning data based on a positional deviation between a target-position command commanding superimposed-type motion including repetitive motion and a positional fed-back variable obtained from an output portion of an electric motor; and an operation control section for controlling the electric motor based on a corrected positional deviation. The learning control unit includes a first learning section for periodically determining, based on the positional deviation, and storing, first learning data according to a first learning period; a learning-data correcting section for correcting the first learning data to eliminate an influence of a local change included in the target-position command or the positional fed-back variable and periodically arising according to a period different from the first learning period; and a positional-deviation correcting section for correcting the positional deviation by using corrected learning data.

10 Claims, 8 Drawing Sheets

CONTROLLER FOR ELECTRIC MOTOR

BACKGROUND OF THE INVENTION

1. Field of the Invention

The present invention relates to a controller for an electric motor.

2. Description of the Related Art

In a machine tool for machining an object to be processed (i.e., a workpiece) into a contour shape having a noncircular cross section, such as a cam grinding machine, a piston lathe, etc., it is known that an electric motor, as a drive source for feeding the workpiece or a tool, is controlled on the basis of a target-position command commanding superimposed-type motion, including repetitive motion, in accordance with a machining program. For example, the cam grinding machine grinds a cam surface having a noncircular contour on the outer periphery of the workpiece, while continuously rotating, on a rotation control axis, a work spindle holding the workpiece, and simultaneously reciprocating, on a linear control axis, a grinding head having a grinding wheel mounted thereon and rotating at high speed, in synchronization with the rotation of the work spindle. In this connection, in order to grind the cam surface into a predetermined dimension, it is necessary to operate the grinding wheel so as to accomplish a depth-setting cut to a predetermined depth on the workpiece. Thus, in the cam grinding process, the motion of the grinding head on the linear control axis is defined as superimposed-type motion, in which the cutting or depth-setting operation for ensuring the desired dimension of the cam surface is superimposed on the reciprocating operation as simple repetitive (or iterative) motion corresponding to the shape of the cam surface. Therefore, a control unit (or controller) provided for the cam grinding machine (e.g., an NC unit) controls the electric motor as a linear drive source of the grinding head, based on a target-position command commanding the superimposed-type motion in which the cutting or depth-setting operation is superimposed on the reciprocating operation (or the repetitive motion).

In the cam grinding machine described above, it is a precondition for achieving the highly precise machining of the cam surface that the rotation of the work spindle is accurately synchronized with the superimposed-type linear motion of the grinding head. To this end, there has been conventionally proposed a method for controlling an electric motor, in which machining errors caused due to the error in synchronization of the rotation of the work spindle and the linear motion of the grinding head can be reduced as much as possible by a learning control (e.g., see Japanese Unexamined Patent Publication (kokai) No. 9-212218 (JP-A-9-212218)). In the control method shown in JP-A-9-212218, based on a positional deviation between a target-position command commanded to an electric motor as the drive source of the grinding head and an actual positional fed-back variable obtained from the grinding head, the learning control is performed so as to correct the target-position command that is to be commanded in a subsequent control cycle. In this connection, the controller is configured to store data relating to the positional deviation in a first storage area referencing a rotation angle of the spindle and a second storage area referencing a movement position of the grinding head, and to correct the target-position command based on these two types of the positional deviation data. According to this configuration, an influence of a torque ripple arising during the rotation of the electric motor can be eliminated and the learning control can be performed appropriately.

Also, as a related art, Japanese Unexamined Patent Publication (Kokai) No. 6-343284 (JP-A-6-343284) discloses a technique, in a control of an AC servomotor, for eliminating an influence of a cogging torque (or a torque ripple) by a learning control. The controller disclosed in JP-A-6-343284 is configured to store a positional deviation between a position input and a rotating position for every rotating position and, by using an input-current compensation value (i.e., learning data) calculated based on the stored positional deviation, repeatedly compensate for an input current. As a result, the cogging torque of the servomotor can be compensated, regardless of a rotation speed. Further, the controller is configured to separately store and learn a first rotating-position deviation depending on the rotating position of the servomotor and a second rotating-position deviation depending on the rotating position and the input current of the servomotor. Therefore, even when a torque fluctuation component depending on only the rotating position and a torque fluctuation component depending on both the rotating position and the input current are included mixedly in the cogging torque, the both of the fluctuation components can be compensated completely.

In the cam grinding machine described above, the motion of the grinding head is typically controlled in such a manner as to make the grinding wheel accomplish a depth-setting cut ensuring a gradually reduced cutting depth so as to sequentially carry out a rough grinding, a fine grinding and a spark-out grinding during one machining cycle, for the purpose of precisely machining a cam surface into a predetermined dimension. In this process, the electric motor as a drive source for the grinding head is controlled on the basis of a target-position command including both a positional component indicating a reciprocating operation as a simple repetitive motion and a positional component indicating a cutting or depth-setting operation by a gradually changing feed rate. In this configuration, the repeatability of the target-position command is lost due to a change in the cutting or depth-setting operation, so that if a typical learning control is performed according to a certain learning period defined by, for example, a rotation angle of the electric motor driving the grinding head, which corresponds to a single revolution of the work spindle (i.e., a rotation angle required for a single reciprocating motion of the grinding head), the positional deviation increases at an instant when the cutting or depth-setting operation changes and, as a result, it becomes difficult to quickly bring the positional deviation into convergence.

On the other hand, in some applications, such as, for example, a toothed-wheel grinding process, the grinding head is controlled in such a manner as to make the grinding wheel continuously accomplish a depth-setting cut ensuring a constant cutting depth during one machining cycle. In this case, a target-position command given to the electric motor driving the grinding head includes a positional component indicating a reciprocating operation as a simple repetitive motion and a positional component indicating a cutting or depth-setting operation by a constant feed rate, and thus the repeatability of the command is maintained. Therefore, when the typical learning control is performed according to the learning period defined by the rotation angle corresponding to the single revolution of the work spindle, it is possible to bring the positional deviation into convergence. However, also in this configuration, if a certain disturbance is applied to the electric motor in a periodic manner according to a period deviating from the learning period, it is difficult for the learning control to bring the disturbance into convergence. For example, the torque ripple inevitably caused by the structure of the electric motor arises at timing shifted correspondingly to the cutting or depth-setting operation at every reciprocating operation, during the operation of the motor for the superimposed-type motion including the reciprocating operation and the cutting or depth-setting operation, so that it is difficult, for the learning control performed according to the learning period defined by the single revolution of the work spindle, to bring the positional deviation resulted from the torque ripple into convergence.

The conventional learning control methods, as described in JP-A-9-212218 and JP-A-6-343284, are not configured to bring a positional deviation into convergence, which tends to increase at an instant when the repeatability of the target-position command is lost in a case where the electric motor is controlled based on the target-position command with no repeatability, such as a linear-motion control for a grinding head in a cam grinding machine, involving a change in a cutting or depth-setting operation. In this connection, a configuration, such that an electric motor is controlled based on a target-position command including both a positional component indicating a simple repetitive motion and a positional component indicating a gradually changing feed rate, is frequently used not only in the cam grinding process but also in several processes for machining a workpiece into a contour shape having a noncircular cross section, such as a polygon grinding process, a piston turning process, etc. However, neither of the learning control methods of JP-A-9-212218 and JP-A-6-343284 considers such versatility. In particular, the learning control method of JP-A-9-212218 can bring the torque ripple in the electric motor into convergence, which arises at timing shifted correspondingly to the cutting or depth-setting operation at every reciprocating operation of the grinding head in the cam grinding machine, but it cannot be applied to machining processes other than the cam grinding process and to a compensation for a disturbance other than the torque ripple.

SUMMARY OF THE INVENTION

It is an object of the present invention to provide a controller for controlling an electric motor based on a target-position command commanding superimposed-type motion including repetitive motion, which can perform an appropriate learning control based on a positional deviation between a target-position command and a positional fed-back variable, even when the repeatability of the target-position command is lost due to a change in the superimposed-type motion or various disturbances, etc., and which can thus highly precisely control the operation of the electric motor.

To accomplish the above object, the present invention provides a controller comprising a learning control unit for determining learning data based on a positional deviation between a target-position command commanding superimposed-type motion including repetitive motion and a positional fed-back variable obtained from an output portion of an electric motor, storing the learning data, and correcting the positional deviation by using the learning data; and an operation control section for controlling an operation of the electric motor based on a corrected positional deviation obtained in the learning control unit; the learning control unit comprising a first learning section for determining, based on the positional deviation, and storing, first learning data in a periodic manner according to a first learning period; a learning-data correcting section for correcting the first learning data in a manner as to eliminate an influence of a local change included in at least one of the target-position command and the positional fed-back variable, the local change arising in a periodic manner according to a period different from the first learning period; and a positional-deviation correcting section for correcting the positional deviation by using corrected learning data obtained by correcting the first learning data in the learning-data correcting section.

In the above controller, the learning-data correcting section may comprise a second learning section for determining, based on the positional deviation, and storing, second learning data different from the first learning data in a periodic manner according to a second learning period corresponding to the period of the local change, a correction calculating section for adding the second learning data to the first learning data, and an input switching section for allowing the positional deviation to be input to either one of the first learning section and the second learning section in a switchable manner.

In this arrangement, the learning-data correcting section may further comprise an output switching section for selectively intercepting an output of the second learning data from the second learning section.

Also, the second learning period may correspond to a period of a disturbance arising in the positional fed-back variable.

The target-position command may include a first positional component repeated in accordance with a period corresponding to the first learning period and a second positional component repeated in accordance with a period corresponding to the second learning period; and the first learning section may determine the first learning data based on a first positional deviation with regard to the first positional component and the second learning section determines the second learning data based on a composite positional deviation with regard to a composite position of the first positional component and the second positional component.

In the above controller, the target-position command may include a first positional component repeated in accordance with a period corresponding to the first learning period and a second positional component repeated in accordance with the period of the local change; the learning-data correcting section may comprise a second positional-deviation estimating section for estimating a second positional deviation with regard to the second positional component, a first positional-deviation calculating section for calculating a first positional deviation with regard to the first positional component based on the second positional deviation and the positional deviation between the target-position command and the positional fed-back variable, and a correction calculating section for adding the second positional deviation to the first learning data; and the first learning section may determine the first learning data based on the first positional deviation.

In this arrangement, the learning-data correcting section may further comprise a second learning section for determining, based on the second positional deviation, and storing, the second learning data different from the first learning data in a periodic manner according to a second learning period corresponding to the period of the local change; and the correction calculating section may add the second learning data, in place of the second positional deviation, to the first learning data.

Also, the target-position command may be previously decomposed into the first positional component and the second positional component, the second positional component being input to the second positional-deviation estimating section.

The learning-data correcting section may further comprise a second positional-component estimating section for estimating the second positional component based on the target-position command, the second positional-deviation estimating section estimating the second positional deviation based on the second positional component estimated in the second positional-component estimating section.

The second positional-deviation estimating section may estimate the second positional deviation by referring to the second positional component included in the target-position command.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below, in detail, with reference to the accompanying drawings. In the drawings, the same or similar components are denoted by common reference numerals.

Figure 1:
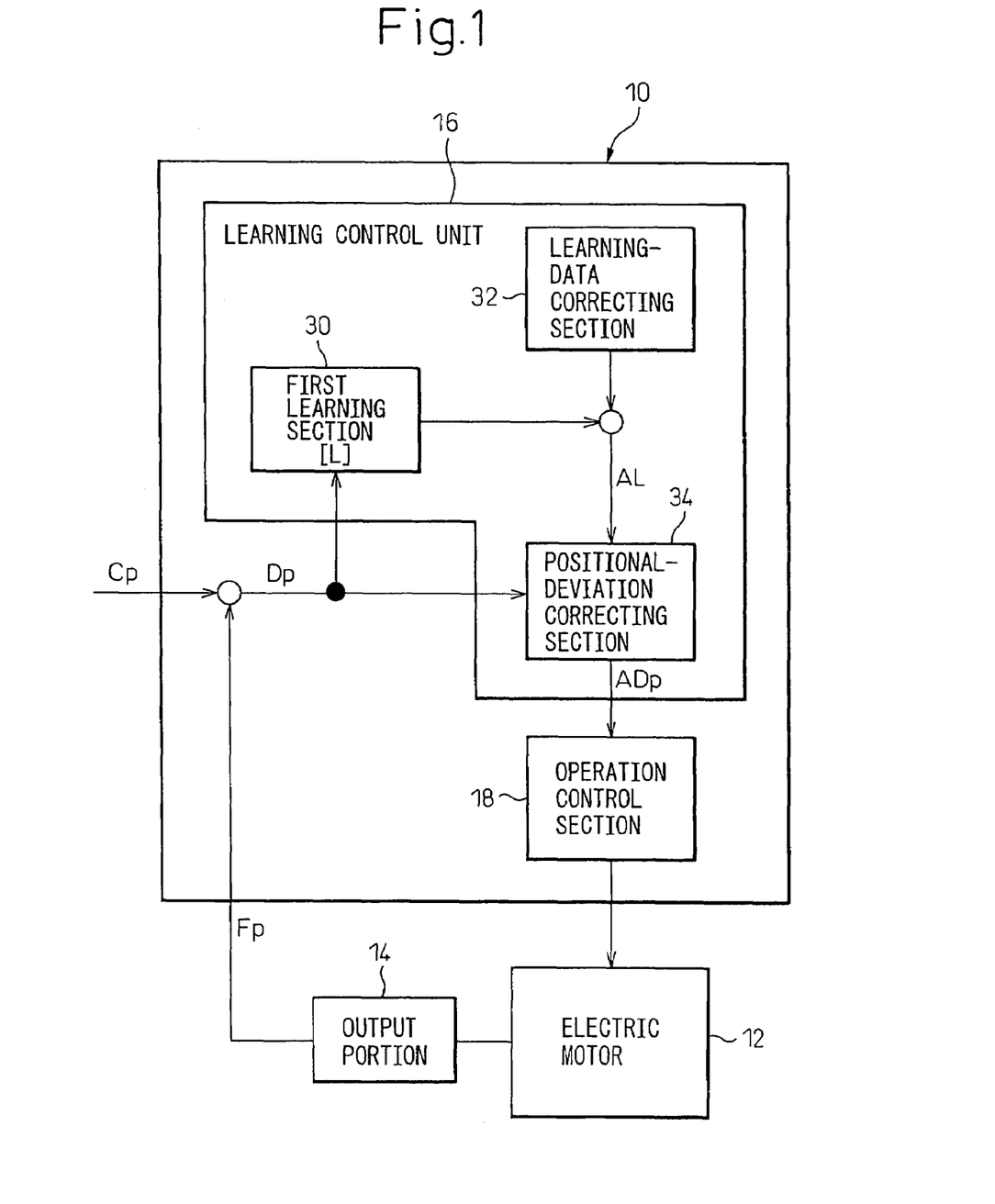
FIG. 1 is a functional block diagram showing a basic configuration of an electric motor controller according to the present invention.

Referring to the drawings, FIG. 1 shows, by a functional block diagram, a basic configuration of a controller 10 for an electric motor, according to the present invention. The controller 10 includes a learning control unit 16 for determining learning data L based on a positional deviation Dp between a target-position command Cp commanding superimposed-type motion including repetitive motion and a positional fed-back variable Fp obtained from an output portion 14 of an electric motor 12, storing the learning data L, and correcting the positional deviation Dp by using the learning data L; and an operation control section 18 for controlling an operation of the electric motor 12 based on a corrected positional deviation ADp obtained through a correction performed in the learning control unit 16. In this connection, the output portion 14 of the electric motor 12 includes, within the meaning of the term, both an output element of the electric motor 12 (such as a shaft, etc.) and an object driven by the electric motor 12 (hereinafter referred to as a driven object), and thus the positional fed-back variable Fp can be obtained by a position sensor, such as an encoder (not shown), provided for the electric motor 12 or the driven object.

Figure 2:
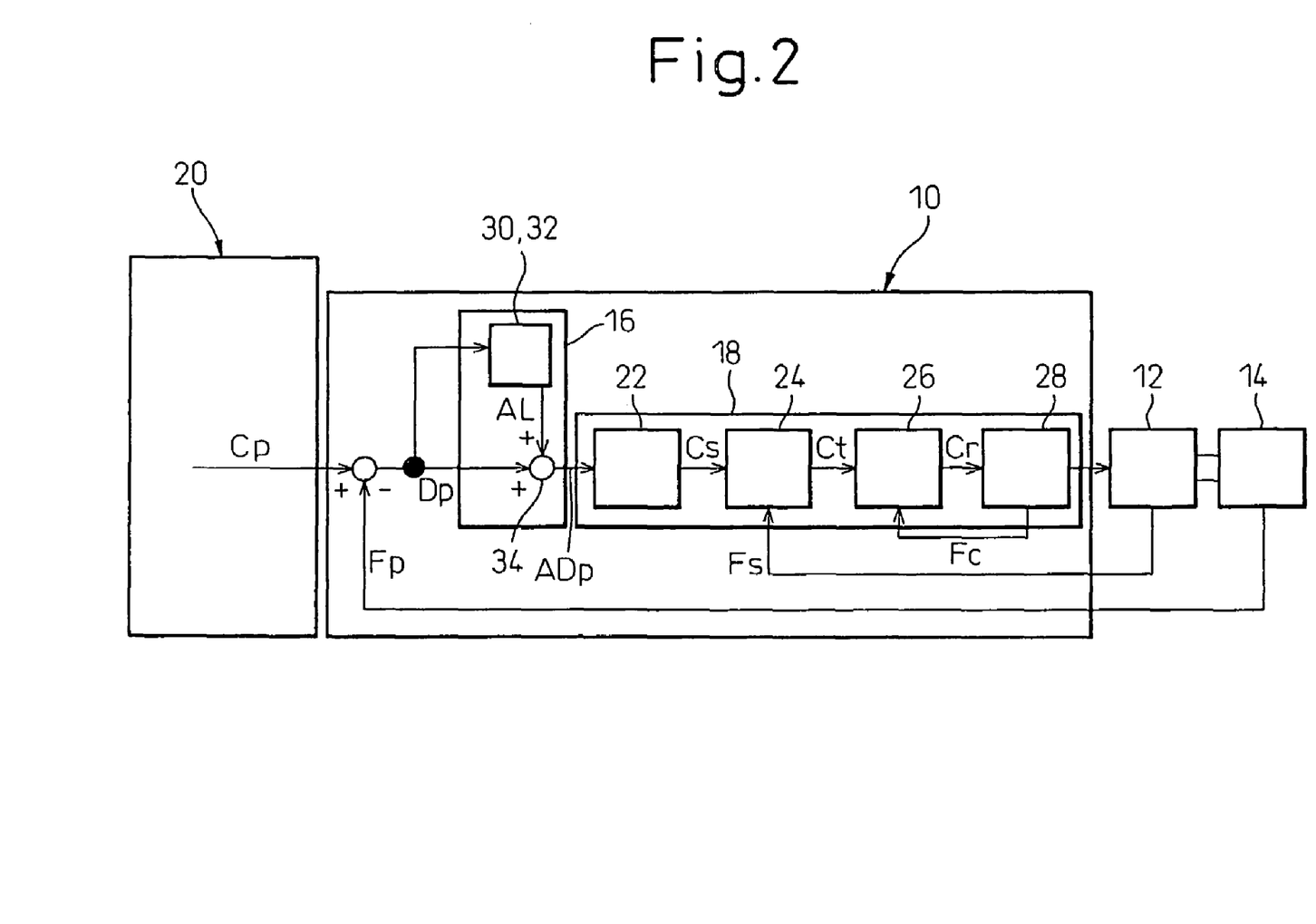
FIG. 2 is an illustration showing one example of a control system to which the controller of FIG. 1 is applied.

As shown in FIG. 2, the controller 10 may be configured to control the operation of the electric motor 12, based on the target-position command Cp input from a host or upper controller 20. Also, the operation control section 18 may include a position control section 22 for calculating a speed command Cs from the corrected positional deviation ADp, a speed control section 24 for calculating a torque command Ct from the speed command Cs and a speed fed-back variable Fs of the electric motor 12, a current control section 26 for calculating a voltage command Cv from the torque command Ct and a current fed-back variable Fc of the electric motor 12, and an amplifier 28 for applying a driving signal to the electric motor 12 according to the voltage command Cv. In this connection, the speed fed-back variable Fs can be obtained by a speed sensor, such as an encoder (not shown), provided for to the electric motor 12, and the current fed-back variable Fc can be obtained from a current sensor (not shown) provided for the amplifier 28.

Referring again to FIG. 1, as the characteristic configuration of the present invention, the learning control unit 16 includes a first learning section 30 for determining, based on the positional deviation Dp, and storing learning data L in a periodic manner according to a predetermined learning period; a learning-data correcting section 32 for correcting the learning data L, in a case where at least one of the target-position command Cp and the positional fed-back variable Fp includes a local change arising in a periodic manner according to a period different from the learning period for the first learning section 30, in a manner as to eliminate an influence of the local change; and a positional-deviation correcting section 34 for correcting the positional deviation Dp by using corrected learning data AL obtained through a correction performed in the learning-data correcting section 32.

In the above configuration, the local change in at least one of the target-position command Cp and the positional fed-back variable Fp includes, as an example of the meaning of a term, a gradual or stepwise change in a feed rate in a positional component indicating a cutting or depth-setting operation included in the target-position command, various disturbances applied to the electric motor (e.g., a torque ripple), etc., in the motion control for a grinding head of a cam grinding machine. The above-described local change in signals becomes a factor to impair repeatability inherent in the target-position command Cp commanding the superimposed-type motion including the repetitive motion.

Figure 3:
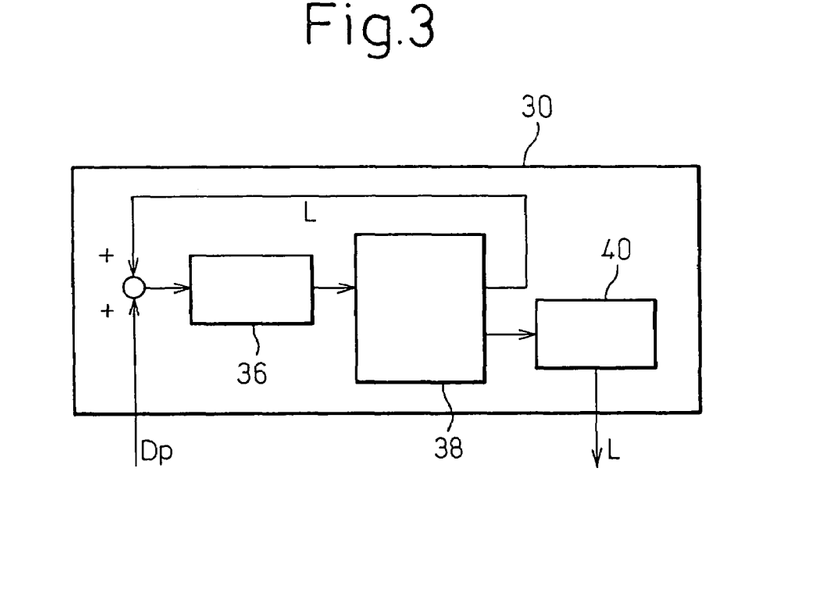
FIG. 3 is an illustration showing an exemplary configuration of a learning section in the controller of FIG. 1.

As shown by way of example in FIG. 3, the first learning section 30 includes a band limiting filter 36, a memory 38 and a dynamic-characteristics compensation element 40, and updates the learning data L at every learning period by adding the positional deviation Dp in the current period to the learning data L in the previous period stored in the memory 38. The band limiting filter 36 has a function to control a high frequency input for stabilizing a control system. The dynamic-characteristics compensation element 40 has a function to compensate for a phase lag and a gain reduction in a controlled system.

In the controller 10 having the above-described configuration, the learning-data correcting section 32 of the learning control unit 16 is configured to correct the learning data L in such a manner as to eliminate the influence of the local change included in at least one of the target-position command Cp and the positional fed-back variable Fp, the local change periodically arising according to the period different from the learning period of the first learning section 30, so that, even when the repeatability of the target-position command Cp is lost due to the local change such as a change in the superimposed-type motion, the various disturbances, etc., it is possible for the positional-deviation correcting section 34 to appropriately correct the positional deviation Dp by using the corrected learning data AL obtained by correcting the learning data L in the learning-data correcting section 32.

For example, in a case where the controller 10 is used to control the electric motor 12 as a drive source for a grinding head in a cam grinding machine, the target-position command Cp typically includes, as already described, both a positional component indicating a reciprocating operation as a simple repetitive motion (i.e., a first positional component) and a positional component indicating a cutting or depth-setting operation by a gradually changing feed rate (i.e., a second positional component). In this connection, if the first learning section 30 of the learning control unit 16 performs a learning control according to a learning period defined by a rotation angle of the electric motor 12, which corresponds to a single revolution of a work spindle (i.e., a rotation angle required for a single reciprocating motion of the grinding head), it is possible to perform an appropriate learning with regard to the first positional component, but a learning with regard to the second positional component may be imperfectly performed because the change in the feed rate in second positional component (i.e., the local change in the target-position command Cp) periodically arises according to a period different from the learning period. Therefore, if the positional deviation Dp is corrected by using the learning data L obtained in the first learning section 30, the positional deviation Dp will locally increase at an instant when the cutting or depth-setting operation of the grinding head changes. In this situation, the learning-data correcting section 32 of the learning control unit 16 corrects the learning data L in such a manner as to eliminate the influence of the change in the feed rate in the second positional component of the target-position command Cp, and the positional-deviation correcting section 34 appropriately corrects the positional deviation Dp by using the corrected learning data AL thus obtained, so that it is possible to quickly bring the positional deviation Dp into convergence.

On the other hand, in a case where the target-position command Cp includes no local change and maintains its repeatability (e.g., it includes a positional component indicating a reciprocating operation as a simple repetitive motion and a positional component indicating a cutting or depth-setting operation by a constant feed rate), such as a case of a motion control for a grinding head in a toothed-wheel grinding machine, it is possible for the controller 10 to bring the positional deviation Dp into convergence, by using the learning data L obtained in the first learning section 30 of the learning control unit 16. However, also in this case, if a disturbance such as a torque ripple is periodically applied, as already described, to the electric motor according to a period deviating from the learning period, it is difficult to bring the positional deviation Dp including such a disturbance (i.e., the local change in the positional fed-back variable Fp) into convergence by using the learning data L. In this situation, the learning-data correcting section 32 of the learning control unit 16 corrects the learning data L in such a manner as to eliminate the influence of the disturbance included in the positional fed-back variable Fp, and the positional-deviation correcting section 34 appropriately corrects the positional deviation Dp by using the corrected learning data AL thus obtained, so that it is possible to quickly bring the positional deviation Dp into convergence.

Further, the controller 10 can be versatilely used to control not only the grinding head of the cam grinding machine or the toothed-wheel grinding machine, but also various electric motors for driving the superimposed-type motion including the repetitive motion, such as an electric motor acting as a feed drive source for a workpiece or a tool in a machining process in which the workpiece is machined into a contour shape having a noncircular cross section, such as a polygon grinding process, a piston turning process, etc. In these applications, the controller 10 can exhibit characteristic effects equivalent to each other. Thus, according to the controller 10, when the electric motor 12 is controlled based on the target-position command Cp commanding the superimposed-type motion including the repetitive motion, it is possible to perform an appropriate learning control based on the positional deviation Dp between the target-position command Cp and the positional fed-back variable Fp, even if the repeatability of the target-position command Cp is lost due to the local change (e.g., a change in the superimposed-type motion, various disturbances, etc.) included in at least one of the target-position command Cp and the positional fed-back variable Fp and periodically arising according to the period different from the learning period of the first learning section 30, and thus to highly precisely control the operation of the electric motor 12.

Figure 4:
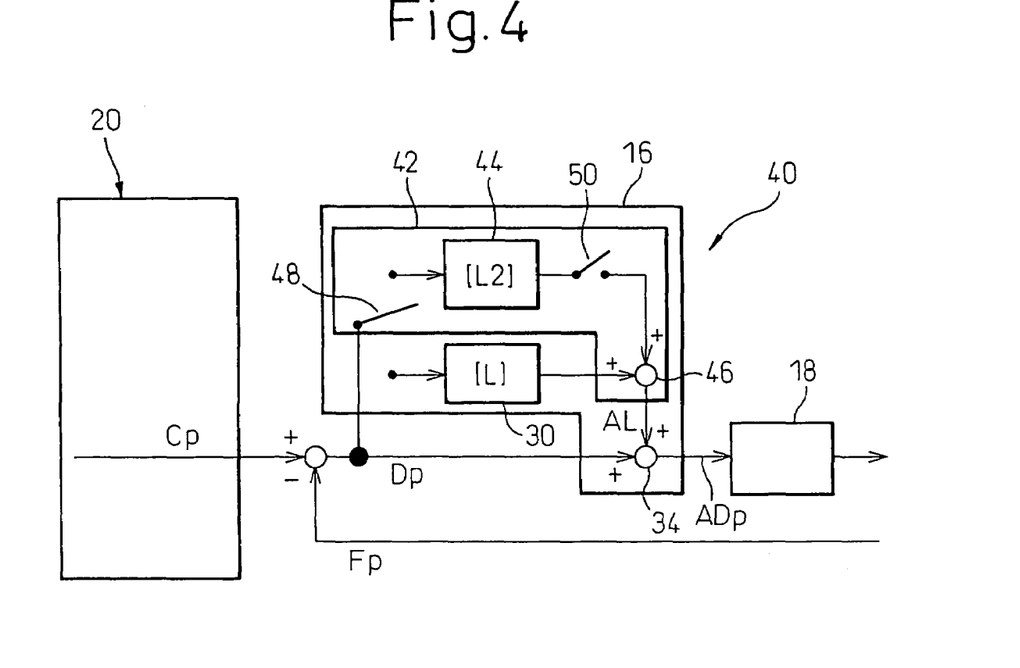
FIG. 4 is a functional block diagram showing a configuration of a controller according to a first embodiment of the present invention.

FIG. 4 shows, by a functional block diagram, a configuration of a controller 40 according to a first embodiment of the present invention. The controller 40 has a basic configuration of the above-described controller 10, except for a specific configuration of a learning-data correcting section 42 of a learning control unit 16 and, therefore, corresponding components are denoted by common reference numerals and the descriptions thereof are not repeated.

The learning-data correcting section 42 of the controller 40 includes a second learning section 44 for determining, based on a positional deviation Dp, and storing second learning data L2, different from learning data L determined in a first learning section 30, in a periodic manner according to a second learning period (i.e., a period different from the learning period of the first learning section 30) corresponding to a period of a local change (e.g., a change in a superimposed-type motion, various disturbances, etc.) included in at least one of a target-position command Cp and a positional fed-back variable Fp, a correction calculating section 46 for adding the second learning data L2 to the learning data L determined in the first learning section 30, and an input switching section 48 for allowing the positional deviation Dp to be input to either one of the first learning section 30 and the second learning section 44 in a switchable manner. In this connection, it should be understood that the second learning period corresponding to the period of the local change means a period as N times the period of the local change (where N is an integer not less than 1). The controller 40 is configured to allow the learning period in each of the first and second learning sections 30, 44 to be freely set. Further, the second learning section 44 may be configured similarly to the first learning section 30 shown in FIG. 3.

In the controller 40, in a case where the local change (e.g., the change in the superimposed-type motion, the various disturbances, etc.) periodically arising according to the period different from the learning period of the first learning section 30 is included in at least one of the target-position command Cp and the positional fed-back variable Fp, although it is difficult to bring the positional deviation Dp into convergence only by correcting the positional deviation Dp by using the learning data L obtained in the first learning section 30, it is possible, by additionally using the second learning data L2 obtained in the second learning section 44 of the learning-data correcting section 42, to quickly bring the positional deviation Dp into convergence. More specifically, the input switching section 48 is first switched to be connected to the first learning section 30 and to input the positional deviation Dp to the first learning section 30, so that the positional deviation Dp is corrected by the learning control using the learning data L. As a result, the positional deviation Dp is corrected with regard to a part thereof other than the local change in the target-position command Cp and the positional fed-back variable Fp (i.e., a part having the repeatability). Next, the input switching section 48 is switched to be connected to the second learning section 44 and to input the positional deviation Dp to the second learning section 44, so that the learning control by using the second learning data L2 is performed according to the second learning period. In this step, the positional deviation Dp is not input to the first learning section 30, but the learning data L is output and, therefore, the correction calculating section 46 operates to add the second learning data L2 to the learning data L so as to correct the learning data L. By using the corrected learning data AL thus obtained, the deviation caused due to the local change, which remains in the positional deviation Dp, is also appropriately corrected and, as a result, the positional deviation Dp converges quickly.

In the controller 40, the learning-data correcting section 42 may further include an output switching section 50, as illustrated, for selectively intercepting an output of the second learning data L2 from the second learning section 44. According to this configuration, if the target-position command Cp and the positional fed-back variable Fp include no local change, the output switching section 50 is operated to intercept the output of the second learning data L2, so that only the learning control in the first learning section 30 is performed and the positional deviation Dp converges quickly.

In the controller 40 configured as described above, if a disturbance according to a specific period, such as a torque ripple, etc., is included in the positional fed-back variable Fp of the electric motor 12 (FIG. 1), it is possible, by using the second learning data L2 determined in the second learning section 44 according to the second learning period corresponding to the period of the disturbance, to quickly bring the positional deviation Dp into convergence. Further, in a case where the target-position command Cp include a first positional component indicating a simple repetitive motion (e.g., the reciprocating motion) and a second positional component indicating a local change in a motion (e.g., the stepwise change in a feed rate), such as the case of a control for a grinding head in a cam grinding machine, it is possible, by using the second learning data L2 determined in the second learning section 44 according to the second learning period corresponding to the period of the second positional component, to quickly bring the positional deviation Dp into convergence.

Figure 5:
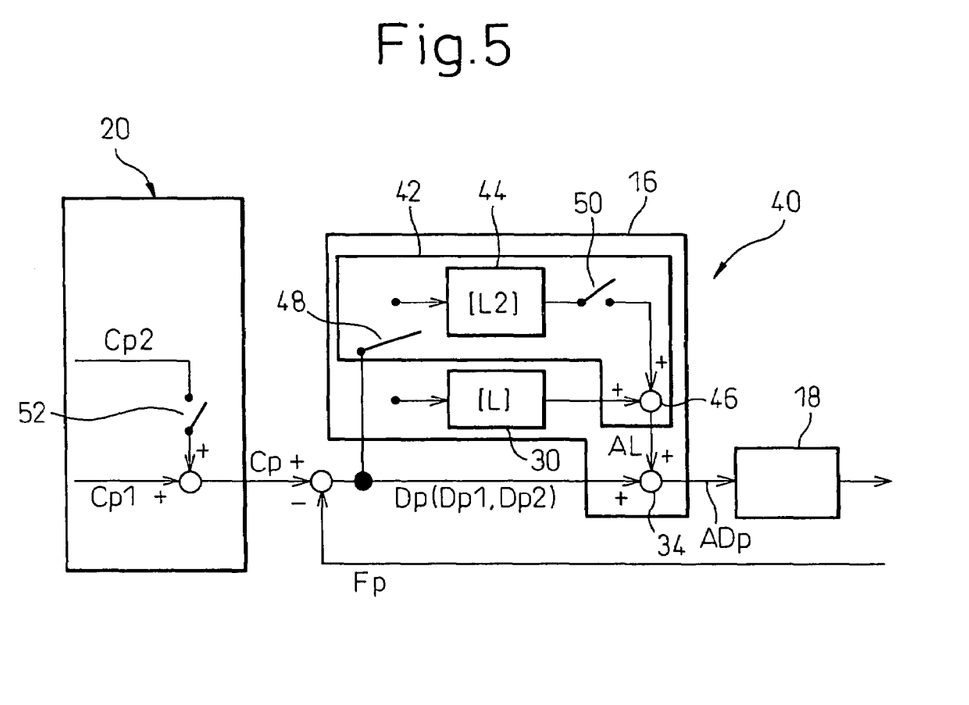
FIG. 5 is an illustration showing a configuration of a modification of the controller of FIG. 4.

In particular, the latter case may be configured, as shown in FIG. 5 as a modification, such that a host or upper controller 20 commands the target-position command Cp by dividing it into a first positional component Cp1 repeated in accordance with a period corresponding to the learning period of the first learning section 30 (i.e., a positional component of a repetitive motion) and a second positional component Cp2 repeated in accordance with a period corresponding to the second learning period of the second learning section 44 (i.e., a positional component of a local change). In this arrangement, the host controller 20 may include a command switching section 52 for selectively intercepting the command of the second positional component Cp2. In this connection, it should be understood that the period corresponding to the learning period means a period as 1/N times the learning period (where N is an integer not less than 1).

In the configuration of the illustrated modification, when the first learning section 30 first performs the learning control as described above, the command switching section 52 is operated to intercept the command of the second positional component Cp2, so as to ensure a state where the target-position command Cp including only the first positional component Cp1 is commanded from the host controller 20. As a result, the first learning section 30 determines the learning data L based on a first positional deviation Dp1 with regard to the first positional component Cp1, so that it is possible, by the learning control using the learning data L, to bring the first positional deviation Dp1 into convergence. Next, when the second learning section 44 performs the learning control according to the second learning period, the command switching section 52 is operated, so as to ensure a state where the target-position command Cp including both the first positional component Cp1 and the second positional component CP2 is commanded from the host controller 20. As a result, the second learning section 44 determines the second learning data L2 based on a composite positional deviation (i.e., the positional deviation Dp) with regard to a composite position of the first positional component Cp1 and the second positional component Cp2 (i.e., the target-position command Cp). In this step, the first positional deviation Dp1 with regard to the first positional component Cp1 can converge by the learning data L, so that it is also possible, by adding the second learning data L2 to the learning data L, to bring a second positional deviation Dp2 with regard to the second positional component Cp2 into convergence, and consequently to quickly bring the positional deviation Dp into convergence.

It should be noted that, in a case where the controller 40 controls the electric motor 12 driving the grinding head in the cam grinding machine, the stepwise change in the feed rate of the grinding head, resulted from the second positional component Cp2, arises in each single machining cycle as a single period and, therefore, the second learning period in the second learning section 44 is a period corresponding to the number of revolutions of the electric motor (i.e., a period N times the number of revolutions, where N is an integer not less than 1) for performing the single machining cycle.

Figure 6:
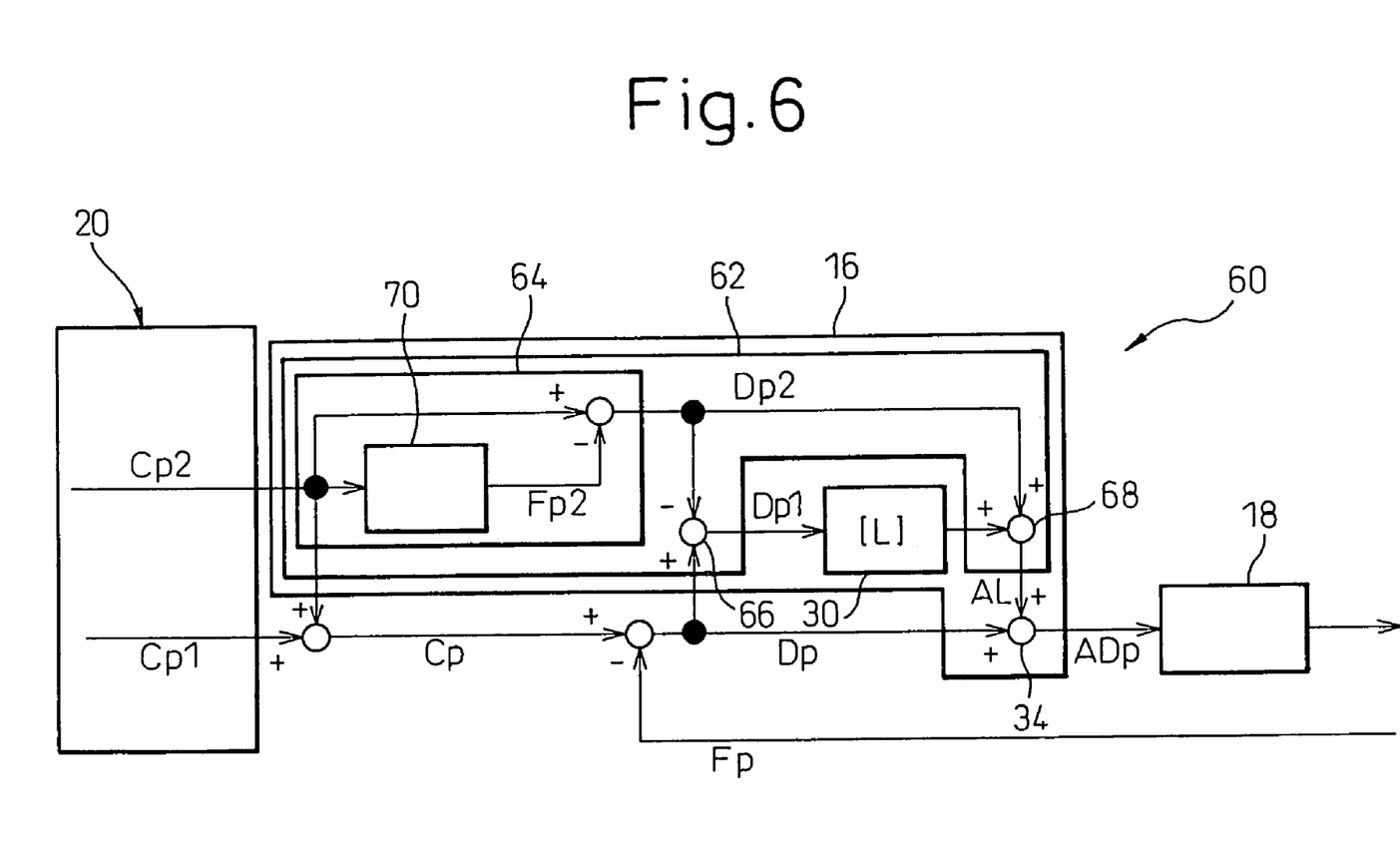
FIG. 6 is a functional block diagram showing a configuration of a controller according to a second embodiment of the present invention.

FIG. 6 shows, by a functional block diagram, a configuration of a controller 60 according to a second embodiment of the present invention. The controller 60 has a basic configuration of the above-described controller 10, except for a specific configuration of a learning-data correcting section 62 of a learning control unit 16 and, therefore, corresponding components are denoted by common reference numerals and the descriptions thereof are not repeated. Further, in the controller 60, it is premised that a host or upper controller 20 issues a target-position command Cp by dividing it into a first positional component Cp1 repeated in accordance with a period corresponding to a learning period of a first learning section 30 (i.e., a positional component of a repetitive motion) and a second positional component Cp2 repeated in accordance with a period of a local change (or a change in a superimposed-type motion) different from the learning period of the first learning section 30 (i.e., a positional component of a local change). In this connection, it should be understood that the period corresponding to the learning period means a period 1/N times the learning period (where N is an integer not less than 1).

The learning-data correcting section 62 of the controller 60 includes a second positional-deviation estimating section 64 for estimating or presuming a second positional deviation Dp2 with regard to the second positional component Cp2 of the target-position command Cp, a first positional-deviation calculating section 66 for calculating a first positional deviation Dp1 with regard to the first positional component Cp1 of the target-position command Cp based on the second positional deviation Dp2 estimated or presumed in the second positional-deviation estimating section 64 and the actual positional deviation Dp, and a correction calculating section 68 for adding the second positional deviation Dp2 estimated or presumed in the second positional-deviation estimating section 64 to the learning data L determined in the first learning section 30. In this connection, the first learning section 30 determines the learning data L based on the first positional deviation Dp1 calculated in the first positional-deviation calculating section 66.

The second positional-deviation estimating section 64 includes an estimator 70 for estimating or presuming a positional fed-back variable Fp2 with regard to the second positional component Cp2, so that it is possible to estimate or presume the second positional deviation Dp2 based on the second positional component Cp2 and the positional fed-back variable Fp2 estimated by the estimator 70. As the estimator 70, for example, a following transfer function G(s) may be adopted:

$$G(s)=(\alpha s+Pg)/(s+Pg)$$

where Pg is a position gain and $\alpha$ is a feed-forward coefficient.

In the controller 60, in a case where the second positional component Cp2 representing the local change (or the change in the superimposed-type motion) periodically arising according to the period different from the learning period of the first learning section 30 is included in the target-position command Cp, although it is difficult to bring the positional deviation Dp into convergence only by using the learning data L determined in the first learning section 30 based on the positional deviation Dp, it is possible, by using the second positional deviation Dp2 with regard to the second positional component Cp2, estimated or presumed in the second positional-deviation estimating section 64 of the learning-data correcting section 62, and the first positional deviation Dp1 with regard to the first positional component Cp1, calculated using the second positional deviation Dp2 in the first positional-deviation calculating section 66, to quickly bring the positional deviation Dp into convergence. In other words, the first learning section 30 determines the learning data L based on the first positional deviation Dp1 with regard to the first positional component Cp1, so that it is possible, by using the learning data L, to quickly bring the first positional deviation Dp1 into convergence. Further, the correction calculating section 68 corrects the learning data L by adding the second positional deviation Dp2 to the learning data L. By using the corrected learning data AL thus obtained, the second positional deviation Dp2 caused due to the local change, which remains in the positional deviation Dp, is also appropriately corrected and, as a result, the positional deviation Dp converges quickly.

In the controller 60 configured as described above, in order to quickly bring the positional deviation Dp into convergence, it is necessary for the second positional-deviation estimating section 64 of the learning-data correcting section 62 to be able to accurately estimate the second positional deviation Dp2 based on the second positional component Cp2 of the target-position command Cp. However, if the estimated or presumed value of the second positional deviation Dp2 has a certain dispersion due to a factor such that the second positional component Cp2 of the target-position command Cp indicates a complicated motion, it is desirable to configure the controller 60, as shown in FIG. 7 as a modification, so as to also learn the second positional deviation Dp2 and thus to appropriately correct the learning data L.

Figure 7:
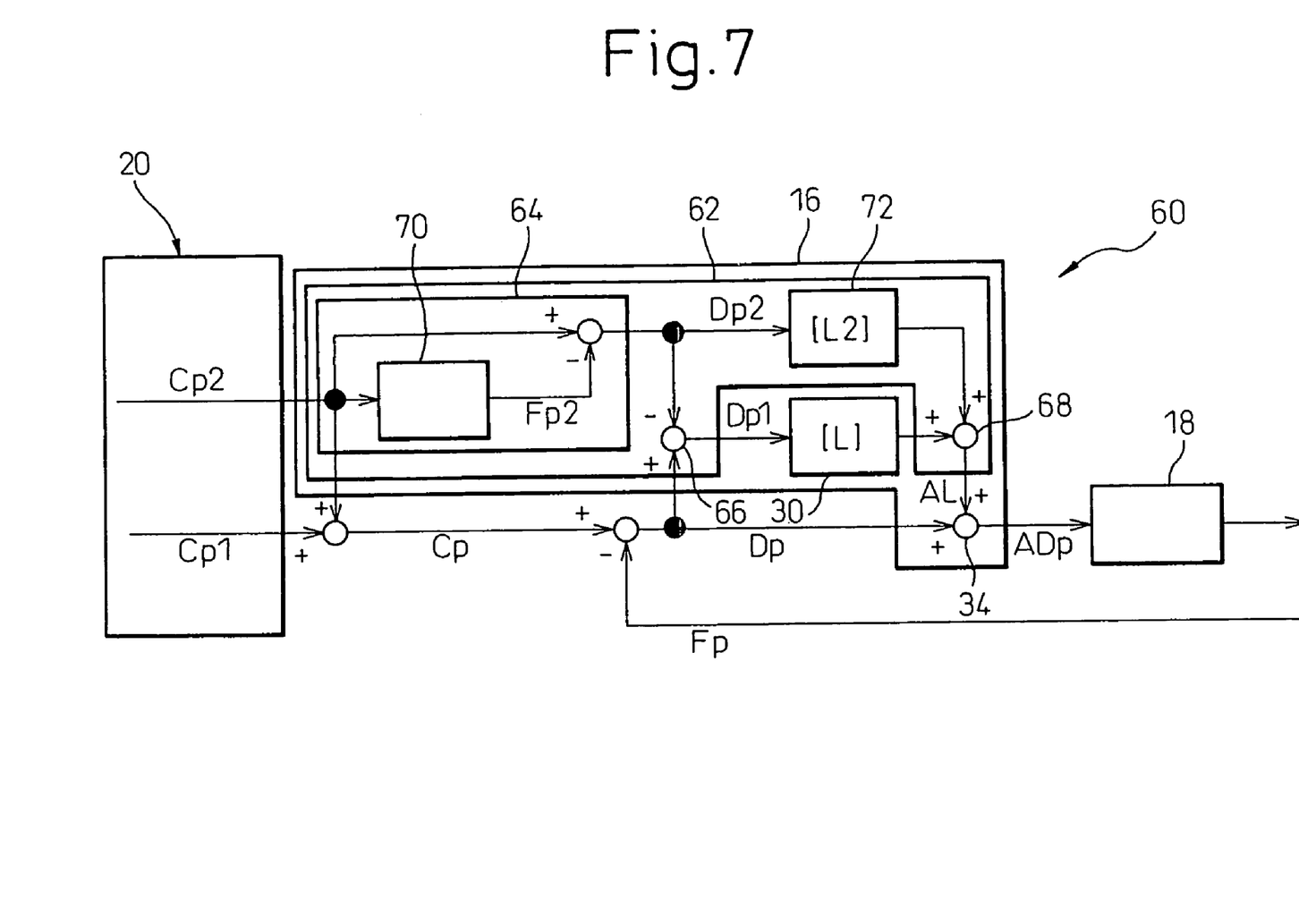
FIG. 7 is an illustration showing a configuration of a first modification of the controller of FIG. 6.

In the modification shown in FIG. 7, the learning-data correcting section 62 further includes a second learning section 72 for determining, based on the second positional deviation Dp2 estimated or presumed in the second positional-deviation estimating section 64, and storing the second learning data L2, different from the learning data L determined in the first learning section 30, in a periodic manner according to a second learning period corresponding to the period of the local change. The correction calculating section 68 is configured to add the second learning data L2 determined in the second learning section 72, in place of the second positional deviation Dp2 estimated in the second positional-deviation estimating section 64, to the learning data L determined in the first learning section 30. According to this configuration, even if the estimated or presumed value of the second positional deviation Dp2 has a certain dispersion, it is possible to appropriately correct the learning data L by using the second learning data L2, and thus to quickly bring the positional deviation Dp into convergence.

The controller 60, shown in FIGS. 6 and 7, has a configuration in which the target-position command Cp is previously decomposed into the first positional component Cp1 and the second positional component Cp2 in the host controller 20, and the second positional component Cp2 is directly input to the second positional-deviation estimating section 64. Therefore, it is not required for the controller 60 to separate the second positional component Cp2 from the target-position command Cp and, therefore, the configuration of the controller 60 can be simplified. However, it is necessary to provide a signal line for inputting the second positional component Cp2 from the host controller 20 to the controller 60.

Figure 8A:
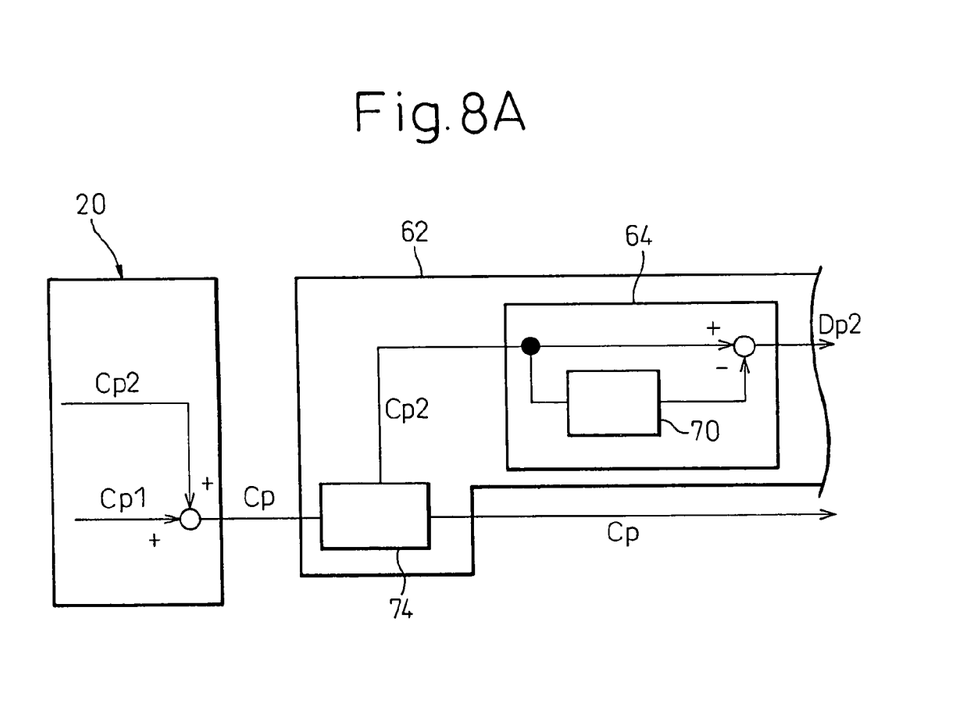
FIG. 8A is an illustration showing a partial configuration of a learning-data correcting section in a second modification of the controller of FIG. 6.

Alternatively, as shown in FIG. 8A, the controller 60 may be configured such that the learning-data correcting section 62 further includes a second positional-component estimating section 74 for estimating or presuming the second positional component Cp2 based on the target-position command Cp. In this arrangement, the second positional-deviation estimating section 64 estimates or presumes the second positional deviation Dp2 based on the second positional component Cp2 estimated in the second positional-component estimating section 74. According to this configuration, it is possible to eliminate a signal line for inputting the second positional component Cp2 from the host controller 20 to the controller 60.

Figure 8B:
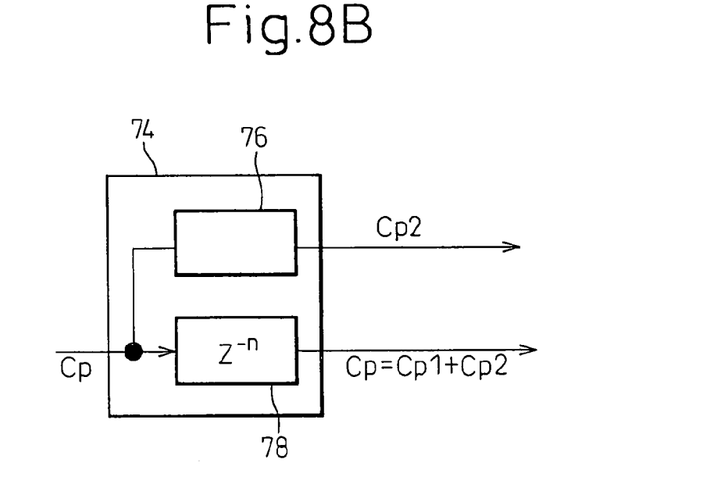
FIG. 8B is an illustration showing a configuration of a second positional-component estimating section in the second modification.

The second positional-component estimating section 74 may be configured such that a low pass filter 76 separates the second positional component Cp2 from the target-position command Cp (FIG. 8B). In this arrangement, to match a signal lag of the second positional component Cp2 caused by the low pass filter 76, a lag module ($Z^{-n}$) 78 is also inserted into the output of the target-position command Cp (=Cp1+Cp2).

Figure 9:
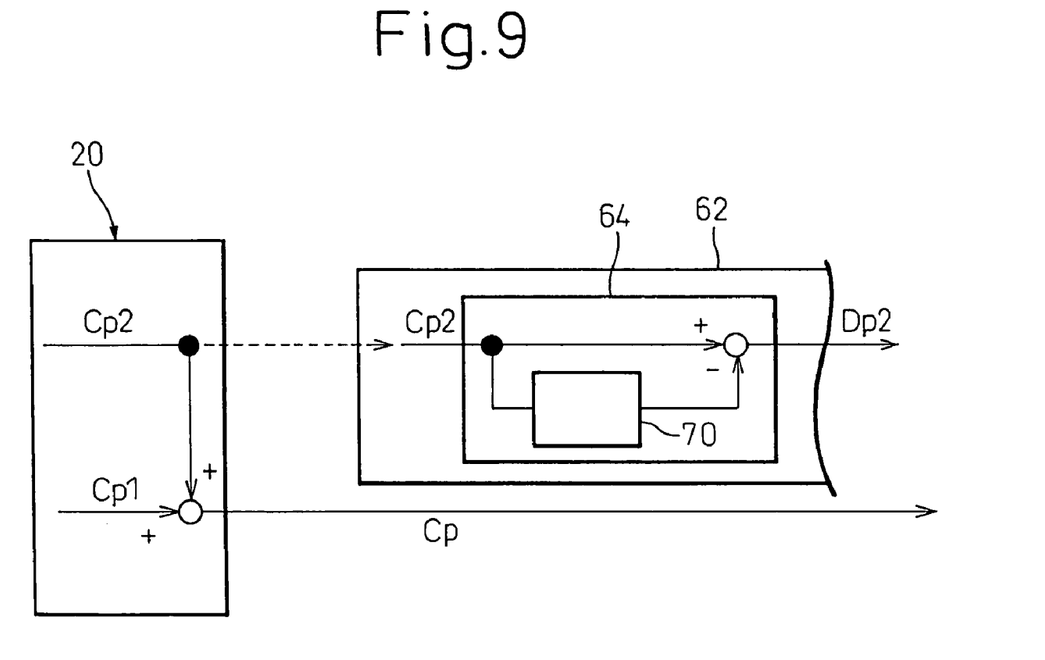
FIG. 9 is an illustration showing a configuration of a third modification of the controller of FIG. 6.

Further, alternatively to the above configuration, the controller 60 may be configured such that, as shown in FIG. 9, the second positional-deviation estimating section 64 estimates or presumes the second positional deviation Dp2 by referring to the second positional component Cp2 included in the target-position command Cp. In this arrangement, the second positional-deviation estimating section 64 operates to read, by itself, the second positional component Cp2 stored in the host controller 20. According to this configuration, it is possible to eliminate a signal line for inputting the second positional component Cp2 from the host controller 20 to the controller 60, and also to improve the accuracy of the second positional deviation Dp2, in comparison with the configuration of FIG. 8A in which the second positional component Cp2 is estimated.

While the invention has been described with reference to specific preferred embodiments, it will be understood, by those skilled in the art, that various changes and modifications may be made thereto without departing from the scope of the following claims.

The invention claimed is:

1. A controller comprising:
    a learning control unit for determining learning data based on a positional deviation between a target-position command commanding superimposed-type motion including repetitive motion and a positional fed-back variable obtained from an output portion of an electric motor, storing the learning data, and correcting the positional deviation by using the learning data; and
    an operation control section for controlling an operation of the electric motor based on a corrected positional deviation obtained in said learning control unit;
    said learning control unit comprising:
        a first learning section for determining, based on said positional deviation, and storing first learning data in a periodic manner according to a first learning period;
        a learning-data correcting section for correcting said first learning data in a manner as to eliminate an influence of a local change included in at least one of said target-position command and said positional fed-back variable, said local change arising in a periodic manner according to a period different from said first learning period; and
        a positional-deviation correcting section for correcting said positional deviation by using corrected learning data obtained by correcting said first learning data in said learning-data correcting section.

2. A controller as set forth in claim 1, wherein said learning-data correcting section comprises a second learning section for determining, based on said positional deviation, and storing second learning data different from said first learning data in a periodic manner according to a second learning period corresponding to said period of said local change, a correction calculating section for adding said second learning data to said first learning data, and an input switching section for allowing said positional deviation to be input to either one of said first learning section and said second learning section in a switchable manner.

3. A controller as set forth in claim 2, wherein said learning-data correcting section further comprises an output switching section for selectively intercepting an output of said second learning data from said second learning section.

4. A controller as set forth in claim 2, wherein said second learning period corresponds to a period of a disturbance arising in said positional fed-back variable.

5. A controller as set forth in claim 2, wherein said target-position command includes a first positional component repeated in accordance with a period corresponding to said first learning period and a second positional component repeated in accordance with a period corresponding to said second learning period; and wherein said first learning section determines said first learning data based on a first positional deviation with regard to said first positional component and said second learning section determines said second learning data based on a composite positional deviation with regard to a composite position of said first positional component and said second positional component.

6. A controller as set forth in claim 1, wherein said target-position command includes a first positional component repeated in accordance with a period corresponding to said first learning period and a second positional component repeated in accordance with said period of said local change; wherein said learning-data correcting section comprises a second positional-deviation estimating section for estimating a second positional deviation with regard to said second positional component, a first positional-deviation calculating section for calculating a first positional deviation with regard to said first positional component based on said second positional deviation and said positional deviation between said target-position command and said positional fed-back variable, and a correction calculating section for adding said second positional deviation to said first learning data; and wherein said first learning section determines said first learning data based on said first positional deviation.

7. A controller as set forth in claim 6, wherein said learning-data correcting section further comprises a second learning section for determining, based on said second positional deviation, and storing a second learning data different from said first learning data in a periodic manner according to a second learning period corresponding to said period of said local change; and wherein said correction calculating section adds said second learning data, in place of said second positional deviation, to said first learning data.

8. A controller as set forth in claim 6, wherein said target-position command is previously decomposed into said first positional component and said second positional component, said second positional component being input to said second positional-deviation estimating section.

9. A controller as set forth in claim 6, wherein said learning-data correcting section further comprises a second positional-component estimating section for estimating said second positional component based on said target-position command, said second positional-deviation estimating section estimating said second positional deviation based on said second positional component estimated in said second positional-component estimating section.

10. A controller as set forth in claim 6, wherein said second positional-deviation estimating section estimates said second positional deviation by referring to said second positional component included in said target-position command.

* * * * *